US007158957B2

(12) United States Patent
Joseph et al.

(10) Patent No.: US 7,158,957 B2
(45) Date of Patent: Jan. 2, 2007

(54) SUPERVISED SELF ORGANIZING MAPS WITH FUZZY ERROR CORRECTION

(75) Inventors: Sindhu Joseph, Kerala State (IN); Sreedharan Venkataraman, Thanjavur (IN)

(73) Assignee: Honeywell International Inc., Morristown, NJ (US)

( * ) Notice: Subject to any disclaimer, the term of this patent is extended or adjusted under 35 U.S.C. 154(b) by 755 days.

(21) Appl. No.: 10/302,694

(22) Filed: Nov. 21, 2002

(65) Prior Publication Data

US 2004/0103070 A1 May 27, 2004

(51) Int. Cl.
G06F 15/18 (2006.01)

(52) U.S. Cl. .............................. 706/12; 707/6; 705/10

(58) Field of Classification Search ................. 706/12; 707/6; 705/10
See application file for complete search history.

(56) References Cited

U.S. PATENT DOCUMENTS

| 5,283,838 | A | * | 2/1994 | Togawa et al. ............. 382/157 |
| 5,343,465 | A |   | 8/1994 | Khalil |
| 5,619,709 | A |   | 4/1997 | Caid et al. ................. 395/794 |
| 5,625,552 | A |   | 4/1997 | Mathur et al. ............. 364/162 |
| 5,640,494 | A |   | 6/1997 | Jabri ........................... 395/24 |
| 5,724,987 | A |   | 3/1998 | Gevins et al. ............. 128/731 |
| 5,963,965 | A | * | 10/1999 | Vogel ...................... 715/501.1 |
| 5,974,412 | A |   | 10/1999 | Hazlehurst et al. ............ 707/3 |
| 6,035,057 | A |   | 3/2000 | Hoffman ..................... 382/159 |
| 6,134,541 | A | * | 10/2000 | Castelli et al. ................. 707/2 |
| 6,157,921 | A |   | 12/2000 | Barnhill ...................... 706/16 |
| 6,171,480 | B1 |   | 1/2001 | Lee et al. ..................... 210/85 |
| 6,226,408 | B1 |   | 5/2001 | Sirosh ....................... 382/224 |
| 6,625,585 | B1 |   | 9/2003 | MacCuish et al. ............ 706/10 |
| 6,886,010 | B1 | * | 4/2005 | Kostoff ........................... 707/3 |
| 6,904,420 | B1 |   | 6/2005 | Shetty et al. |
| 6,931,418 | B1 | * | 8/2005 | Barnes ......................... 707/10 |
| 2002/0069218 | A1 |   | 6/2002 | Sull et al. ................. 707/501.1 |
| 2002/0099675 | A1 | * | 7/2002 | Agrafiotis et al. ............ 706/15 |
| 2002/0129015 | A1 |   | 9/2002 | Caudill et al. .................. 707/6 |
| 2003/0210816 | A1 |   | 11/2003 | Comaniciu et al. |

OTHER PUBLICATIONS

Steven Geffner et al., The Dynamic Data Cube, EDBT 2000, LNCS 1777, pp. 237-253, 2000, Springer-Verlag.*
Kurimo, M. , et al., "Fast Latent Semantic Indexing of Spoken Documents By Using Self-Organizing Maps", *2000 IEEE International Conference on Acoustics, Speech, and Signal Processing, Part 4*, vol. 4, (Jun. 2000),2425-8.

* cited by examiner

*Primary Examiner*—Leslie Wong
*Assistant Examiner*—Robert M. Timblin
(74) *Attorney, Agent, or Firm*—Kris T. Fredrick

(57) ABSTRACT

A system and a method for an automated intelligent information mining includes receiving unstructured text from various text sources; extracting multiple key-phrases from the unstructured text; generating template and dynamic information contextual relation maps by mapping the extracted key-phrases to three-dimensional maps using a self organizing map, and a gaussian distribution technique. Further, the technique includes forming word clusters and constructing corresponding key-phrase frequency histograms for each of the generated contextual relation maps. Template and dynamic information three-dimensional structured document maps from the constructed phrase frequency histograms and the generated self-organizing maps. Desired information is extracted by mapping the generated dynamic information three-dimensional structured map onto the template three-dimensional structured map. A fuzzy prediction algorithm is used in possible error correction in extracting the desired intelligent information. A negative learning error correcting algorithm is used to correct the three-dimensional template relation maps depending on the fuzzy feedback.

40 Claims, 6 Drawing Sheets

SUPERVISED SELF ORGANIZING MAPS WITH FUZZY ERROR CORRECTION

CROSS-REFERENCE TO RELATED APPLICATION

This application is related to the co-pending, commonly assigned U.S. patent application Ser. No. 09/825,577, filed May 10, 2001, entitled "INDEXING OF KNOWLEDGE BASE IN MULTILAYER SELF-ORGANIZING MAPS WITH HESSIAN AND PERTURBATION INDUCED FAST LEARNING" is hereby incorporated by reference in its entirety. This application is also related to the co-pending, commonly assigned U.S. patent application Ser. No. 09/860,165, filed May 17, 2001, entitled "A NEURO/FUZZY HYBRID APPROACH TO CLUSTERING DATA" hereby incorporated by reference in its entirety.

FIELD OF THE INVENTION

This invention relates generally to the field of information mining, and more particularly pertains to an automated intelligent information mining technique.

BACKGROUND

With the explosive growth of available information sources it has become increasingly necessary for users to utilize information mining techniques to find, extract, filter, and evaluate desired information. Human translation is generally laborious, expensive, and error-prone and not a feasible approach for extracting desired information.

Automating information mining techniques to mine information in text documents can be difficult because the text documents are in human readable and understandable format that lack inherently defined structure and appears as meaningless data for the information mining techniques, because text can come from various sources, such as a database, e-mail, Internet and/or through a telephone in different forms. Also, text documents coming from various sources can be high dimensional in nature containing syntactic, semantic (contextual) structure of words/phrases, temporal and spatial information which can cause disorderliness in the information mining process.

Current information mining techniques such as hierarchical keyword searches, statistical and probabilistic techniques, and summarization using linguistic processing, clustering, and indexing dominate the unstructured text processing arena. The most prominent and successful of the current information mining techniques require huge databases including domain specific keywords, comprehensive domain specific thesauruses, computationally intensive processing techniques, laborious human interface and human expertise.

There has been a trend in the development of information mining techniques to be domain independent, to be adaptive in nature, and to be able to exploit contextual information present in text documents to improve processing speeds of information mining techniques. Current techniques for information mining use self-organizing maps (SOMs) to exploit the contextual information present in the text. Currently, SOMs are the most popular artificial neural network algorithms. SOMs belong to a category of competitive learning networks. SOMs are generally based on unsupervised learning (training without a teacher), and they provide a topology that preserves contextual information of unstructured document by mapping from a high dimensional data (unstructured document) to a two dimensional map (structured document), also called map units. Map units, or neurons, usually form a two dimensional grid and hence the mapping from high dimensional space onto a plane. Thus, SOMs serve as a tool to make clusters for analyzing high dimensional data. Word category maps are SOMs that have been organized according to word similarities, measured by the similarity between short contexts of the words. Contextually interrelated words tend to fall into the same or neighboring map nodes. Nodes may thus be viewed as word categories.

Current pending U.S. patent application Ser. No. 09/825,577, dated May 10, 2002, entitled "INDEXING OF KNOWLEDGE BASE IN MULTILAYER SELF-ORGANIZING MAPS WITH HESSIAN AND PERTURBATION INDUCED FAST LEARNING" discloses such an information technique using the SOMs that is domain independent, adaptive in nature that can exploit contextual information present in the text documents, and can have an improved learning rate that does not suffer from losing short contextual information. One drawback with this technique is that the histogram formed from the clusters is very much dependent on the clusters and is very specific and sensitive to the cluster boundary. The elements in or near the boundary may suffer from this rigidity. This might have adverse effects on the accuracy of the information mining.

The SOM based algorithm disclosed in the above-mentioned pending application uses heuristic procedures and so termination is not based on optimizing any model of the process or its data. The final weight vectors used in the algorithm usually depend on the input sequence. Different initial conditions yield different results. It is recommended that the alteration of several parameters of the self-organizing algorithm, such as learning rate, the size of update neighborhood and the strategy to alter these parameters during learning from one data set to another will yield useful results. There is a need for an improved adaptive algorithm responsive to changing scenarios and external inputs. There is a further need for uniformity in neighborhood size. There is yet a further need for an algorithm that preserves neighborhood relationships of the input space in the face of bordering neurons that have fewer neighborhoods than others.

SUMMARY OF THE INVENTION

The present invention provides an automated intelligent information mining technique for various types of information mining applications such as data and text mining applications, identification of a signal from a stream of signals, pattern recognition applications, and/or natural language processing applications. Unstructured text is received from various text sources, and key-phrases are extracted from the received unstructured text. Each of the extracted key-phrases are transformed into a unique numerical representation. Layers of template and dynamic information contextual relation maps are generated by mapping the transformed key-phrases to the surfaces of three-dimensional maps, respectively, using a self-organizing map and a gaussian distribution (function approximation of neighborhood). Further, word clusters are formed and corresponding key-phrase frequency histograms are constructed for each of the generated contextual relation maps. Template and dynamic information three-dimensional structured document maps are generated from the constructed key-phrase frequency maps and the generated contextual maps using the self-organizing map and gaussian distribution technique.

Desired information is extracted by masking the generated dynamic information three-dimensional structured map to the template three-dimensional structured map.

If the extracted information is not substantially the same as the expected information, a fuzzy prediction algorithm using basis histogram on the histograms obtained from the template and dynamic information contextual relation maps is used to extract desired information. The extracted desired intelligent information obtained using the fuzzy prediction algorithm is also compared to the expected information. A learning vector quantization (LVQ) based negative learning error correcting algorithm is used to correct the formed 3D template information structured map, when the extracted information obtained using the fuzzy prediction algorithm is substantially same as the expected information.

The LVQ based negative learning error correcting algorithm is used to correct the three-dimensional template contextual relation map, when the extracted desired intelligent information obtained using the fuzzy prediction algorithm is not substantially same as the expected information.

Other aspects of the invention will be apparent on reading the following detailed description of the invention and viewing the drawings that form a part thereof.

DETAILED DESCRIPTION

This document describes an improved automated information mining technique applicable to various types of information mining applications such as data and text mining applications, identification of a signal from a stream of signals, pattern recognition applications, and/or natural language processing applications.

Figure 1:
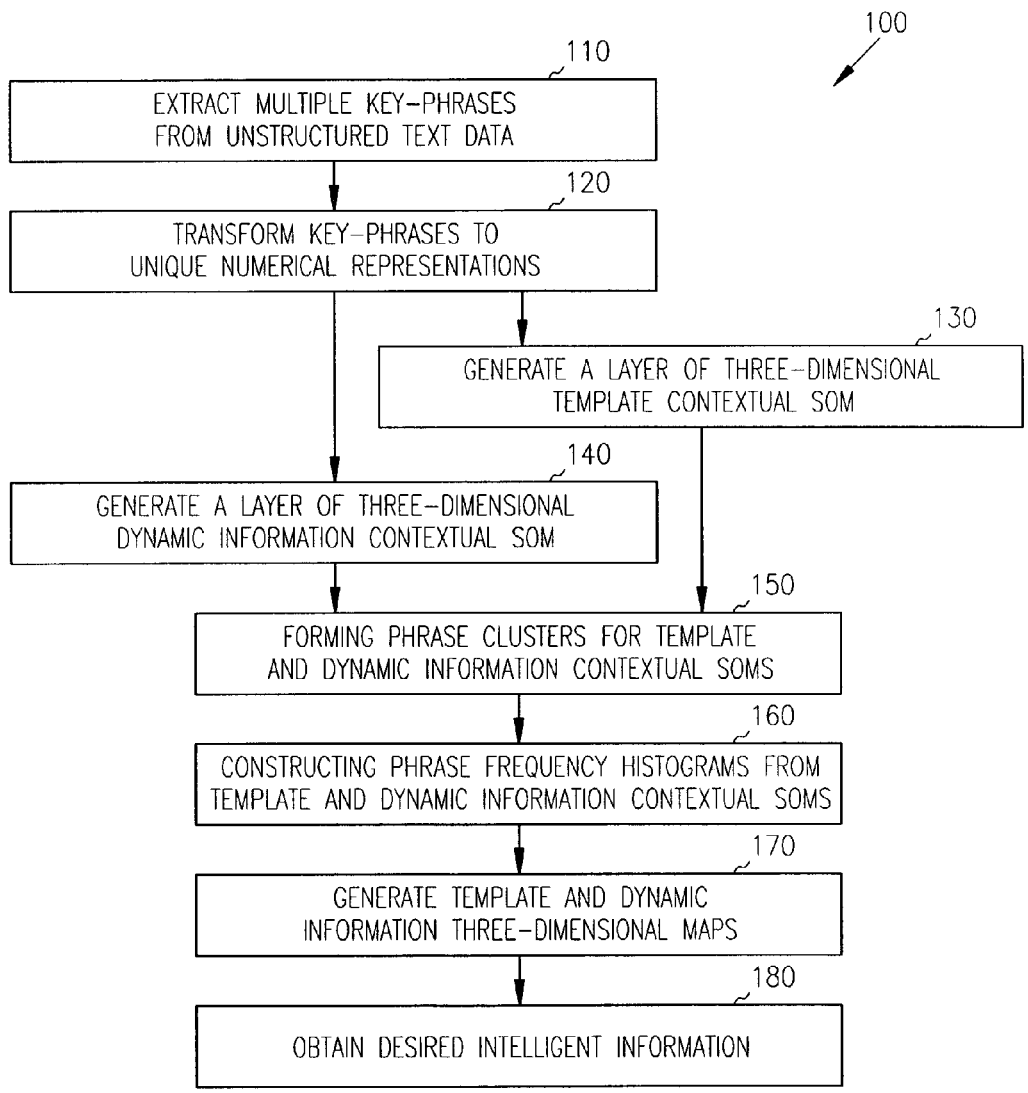
FIG. 1 is a flowchart illustrating one embodiment of intelligent information mining according to the present invention.

FIG. 1 is a flowchart illustrating one example embodiment of a process 100 of intelligent information mining of the present invention. The flowchart includes operations 110–180, which are arranged serially in the exemplary embodiment. However, other embodiments of the invention may execute two or more operations in parallel using multiple processors or a single processor organized as two or more virtual machines or sub-processors. Moreover, still other embodiments implement the operations as two or more specific interconnected hardware modules with related control and data signals communicated between and through the modules, or as portions of an application specific integrated circuit. Thus, the exemplary process flow is applicable to software, firmware, and hardware implementations.

The process begins with operation 110 by receiving unstructured text from various sources such as a data base/data warehouse, a LAN/WAN network, SAN, Internet, a voice recognition system, and/or a mobile/fixed phone. Operation 110 can also begin by receiving image signals that are stored in a buffer, online, and/or a file.

Operation 110 further includes extracting multiple key-phrases from the received unstructured text. In some embodiments, element 110 also extracts multiple key-words from the received text and can form the multiple key-phrases from the extracted key-words. In these embodiments, element 110 extracts key-words from the received text based on a specific criteria such as filtering to remove all words comprised of three or fewer letters, and/or filtering to remove rarely used words. The formed key-phrases can include one or more extracted key-words and any associated preceding and following words adjacent to the extracted key-words to include contextual information. In some embodiments, element 110 further morphologizes the extracted key-words based on fundamental characteristics of the extracted key-words. For example, the element 110 can morphologize in such a way that morphed (altered) words' pronunciation or meaning remain in place.

Operation 120 transforms each of the extracted key-words, phrases and/or morphed words to a unique numerical representation. Extracted key-words are transformed such that the transformed unique numerical representation does not result in multiple similar numerical representations, to avoid ambiguous prediction of meaning of the translated words in the received text.

Operation 130 generates a layer of three-dimensional (3D) template contextual relation map using a self-organizing map (SOM) to categorize the extracted key-phrases based on contextual meaning. In some embodiments, the layer of 3D template contextual relation map is generated by obtaining a predetermined amount of key-phrases from the extracted multiple key-phrases. In some embodiments, the 3D template contextual relation map is a spherical shaped template contextual relation map.

Before proceeding with generating of the 3D template contextual relation map, the map parameters are set to naturally converge around a sphere by considering each row of neurons in the map to represent a horizontal slice of a sphere with the angle of latitude between adjacent slices being equal. The number of neurons $n_k$ in the slice k is proportional to the circumference of the slice. The following equation is used to calculate the number of neurons $n_k$ given d, the number of slices, $$n_k = 2d \sin(\pi/2 - \theta_n)$$

Where $\theta_n$: the angle of latitude of slice n.

The resulting map will be the acceptable shape to converge to the topology of a sphere.

Input patterns (multiple key-phrases) are then presented to the self-organizing map (artificial neural network).

$$x_1, x_2, \ldots x_n \in R^n$$

where each of the $x_1, x_2, \ldots x_n$ are triplets (normalized unique representations of key-phrases including preceding word, reference key word, and succeeding word) of the high dimensional text data Random weights are then initialized using a random number generator and normalized between 0 and 1 (because the inputs to the network are also normalized between 0 and 1). The strength between input and output layer nodes are referred to as weights, and updating of weights is generally called learning.

$w_i \equiv [w_{i1}, w_{i2}, \ldots, w_{in}]^T \epsilon R^n$, where $w_{i1}, w_{i2}, \ldots, w_{in}$ are the random weights, where 'n' is a dimension of the input layer. Generally, 'n' is based on the number of input patterns/vectors (key-phrases). In the following example of assigned random weights, dimension 'n' is initialized using 10.

0.24, 0.98, 0.47, . . . , 0.25, 0.94, 0.62

In some embodiments, the initial neighborhood radius is set to $\sigma_0 = \pi/6$, the initial neighborhood is taken as the circle with radius $\sigma_0$.

Compute distance to all nodes using modality-vectors as follows:

$$d_{ij} = \cos^{-1}[(x_1 x_j + y_1 y_j + z_1 z_j)/(\sqrt{(x_1^2 + y_1^2 + z_1^2)} * \sqrt{(x_j^2 + y_j^2 + z_j^2)})]\ 0.6239, 0.81. 0.04 \ldots$$

The winner among all the nodes are then determined as follows:

$$d_{i,c} = (\min\{d_{i,j}\}) \ \forall \ j : 1 \text{ to } m$$
$$= 0.04.$$

update the value of the weight vector of the winner and neighborhood using the following equation:

$$w_j(n+1) = w_j(n) + \eta(n)\ \pi_{j,i(x)}(n)[x(n) - w_j(n)]$$

Wherein $W_j$=weights of node j

X(n)=input at time n $\pi j,i$ (n)=neighborhood function centered around winning node I(x) given by $$\exp(-d^2_{1,j}/2\sigma^2(n))$$

Wherein $\eta(n)$=the learning rate with typical range [0.1–0.01]

$\eta_0 \exp(-n/\tau_2)$ $\sigma(n)$=Standard deviation $\sigma_0 \exp(-n/\tau_1)$ $\sigma_0 = 3.14/6$ Wherein $\tau_1, \tau_n$=time constants $\tau_1 = 1000/\log(\sigma_0), \tau_n = 1000$ The angle subtended by categories (neurons) at the center of the sphere can be taken as measure of topographic distance between two neurons. If two neurons are spatially located at (x1, $y_1$, $z_1$) and (x2, $y_2$, $z_2$) then angular distance is given by $$d_{ij} = \cos^{-1}[(x_1 x_2 + y_1 y_2 + z_1 z_2)/(\sqrt{(x_1^2 + y_1^2 + z_1^2)} * \sqrt{(x_2^2 + y_2^2 + z_2^2)})]$$

Operation 140 includes generating a layer of 3D dynamic information contextual map using the extracted multiple key-phrases. The process used to generate the layer of 3D dynamic information contextual relation map is similar to the above-described process of generating the layer of 3D template contextual relation map. In some embodiments, the 3D dynamic information contextual map is a spherical shaped 3D dynamic information contextual map. Operations 130 and 140 are performed in parallel in one embodiment, but may also be performed serially.

Operation 150 includes forming phrase clusters for the generated template and dynamic information contextual relation maps. In some embodiments, the phrase clusters are formed based on positions obtained from the above-illustrated equations using the least square error algorithm.

Operation 160 includes constructing key-phrase frequency histogram consisting of frequency of occurrences of multiple key-phrases using the generated template and dynamic information contextual relation maps. In some embodiments, the key-phrase frequency histogram is constructed by determining the number of times each of the key-phrases appear, in each of the generated contextual relation maps.

Operation 170 then includes generating template and dynamic information three-dimensional (3D) structured document maps using the constructed phrase frequency histogram and the generated contextual relation maps using the self-organizing map so that each of the generated 3D structured document maps include phrase clusters based on similarity relationship between the formed word clusters. Operation 180 then obtains desired intelligent information by mapping the generated 3D dynamic information structured map to the template 3D structured map.

In some embodiments, the template and dynamic information contextual relation maps and the template and dynamic information structured maps are generated by mapping the transformed multiple key-phrases on to the surface of the spherical map using the self-organizing map and the gaussian approximation neighborhood technique. The gaussian distribution enables the neighbor neurons selected for weight updation to be independent of the neighborhood structure. In these embodiments, gaussian approximation neighborhood technique includes updating values of weight factors of winner category and neighborhood using the equation:

$$w_j(n+1) = w_j(n) - \eta(n)\ \pi_{j,i(x)}(n)[x(n) - w_j(n)]$$

$$w_j(n+1) = w_j(n) + \eta(n)\ \pi_{j,i(x)}(n)[x(n) - w_j(n)]$$

Wherein $w_j$=weights of node j , X(n)=input at time n, and $\pi j,i$ (n)=neighborhood function centered around winning node I(x) is given by the gaussian distribution function:

$$\exp(-d^2_{1,j}/2\sigma^2(n))$$

Wherein $\eta(n)$=the learning rate with typical range [0.1–0.01], $\eta_0 \exp(-n/\tau_2)$, $\sigma(n)$=Standard deviation $\sigma_0 \exp(-n/\tau_1)$, $\sigma_0 = 3.14/6$, and $\tau_1, \tau_n$=time constants, where $\tau_1 = 1000/\log(\sigma_0)$ and $\tau_n = 1000$.

Figure 2:
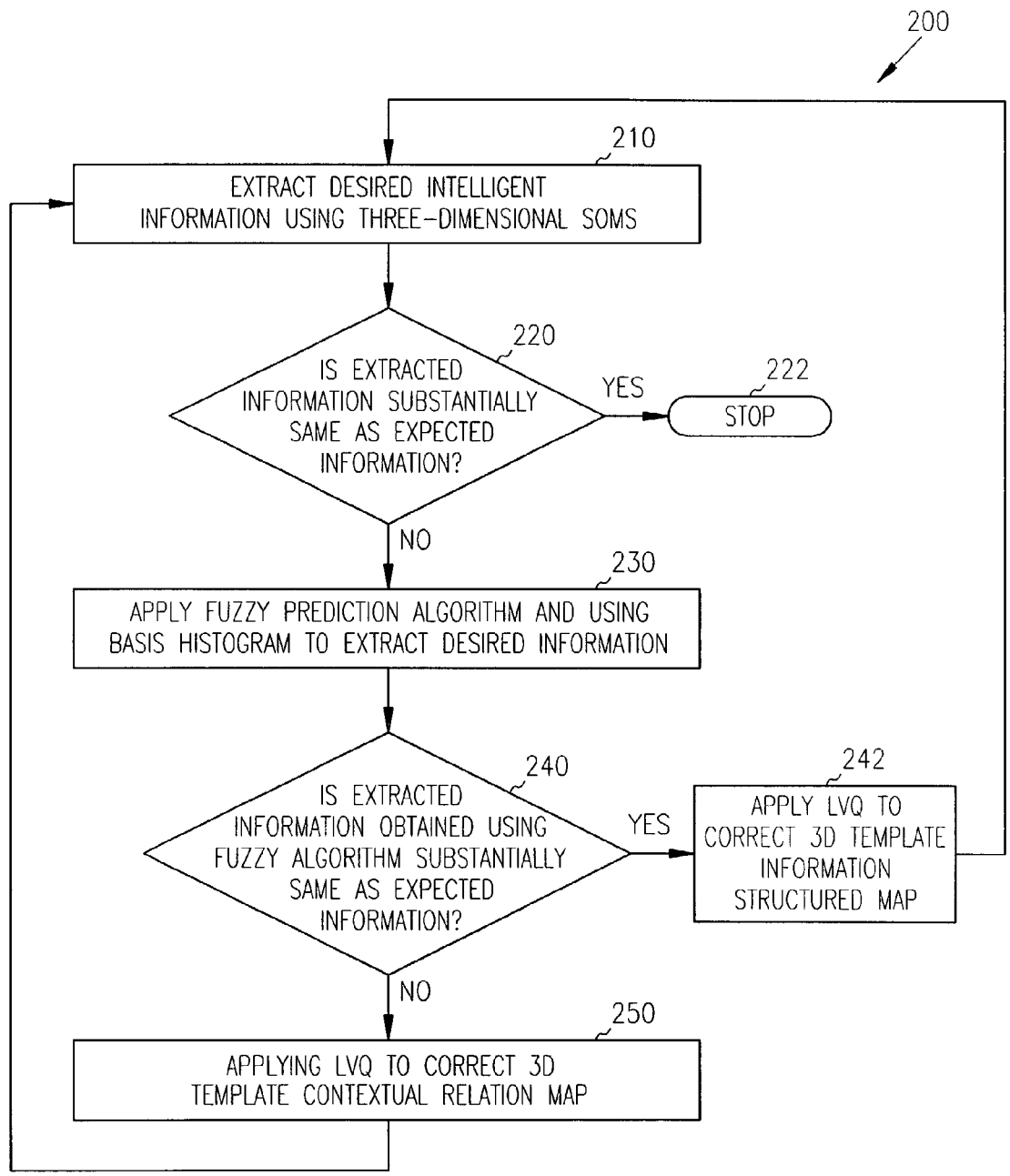
FIG. 2 is a flowchart illustrating one embodiment of a closed loop system including an error feedback function used to extract intelligent information mining according to the present invention.

FIG. 2 is a flowchart illustrating one example embodiment of a process 200 of error correction algorithm used to correct boundary sensitiveness according the present invention. The flowchart includes operations 210–250 Other embodiments of the invention may execute operations serially, or two or more operations in parallel using multiple processors or a single processor organized as two or more virtual machines or sub-processors. Moreover, still other embodiments implement the operations as two or more specific interconnected hardware modules with related control and data signals communicated between and through the modules, or as portions of an application specific integrated circuit. Thus, the exemplary process flow is applicable to software, firmware, and hardware implementations.

The process begins with extracting desired intelligent information from unstructured text using the 3D template contextual map and the 3D template structured information map at 210 as described-above with reference to FIG. 1.

Error feedback from future operations is provided. Operation 220 compares the extracted desired intelligent information to expected information. Operation 222 includes stopping the process 200 and keeping the extracted intelligent information, when the extracted desired intelligent information is substantially same as the expected information.

If the extracted information is not substantially the same as the expected information, operation 230 applies a fuzzy prediction algorithm using basis histogram on the histograms obtained from the template and dynamic information contextual relation maps to extract desired intelligent information. One such fuzzy prediction algorithm is described in U.S. patent application Ser. No. 09/860,165, filed May 17, 2001, entitled "A NEURO/FUZZY HYBRID APPROACH TO CLUSTERING DATA" hereby incorporated by reference in its entirety. Operation 240 compares the extracted desired intelligent information obtained using the fuzzy prediction algorithm to the expected information. Operation 242 includes applying a learning vector quantization (LVQ) based negative learning error correcting algorithm to correct the formed 3D template information structured map, when the extracted desired intelligent information is substantially same as the expected information.

Operation 250 includes applying the LVQ based negative learning error correcting algorithm to correct the 3D template contextual relation map, when the extracted desired intelligent information obtained using the fuzzy prediction algorithm is not substantially same as the expected information. The information extraction continues using the corrected 3D self organizing maps.

In some embodiments, applying the LVQ based negative learning error correcting algorithm includes applying substantially small negative and positive learning correction to an outer cover to correct and incorrect cluster boundaries in the 3D template structured map and the 3D template contextual relation map using the equation:

$$w_j(n+1)=w_j(n)-\eta(n)\ \pi_{j,i(x)}(n)[x(n)-w_j(n)]$$

$$w_j(n+1)=w_j(n)+\eta(n)\ \pi_{j,i(x)}(n)[x(n)-w_j(n)]$$

Wherein $w_j$=weights of node j, $X(n)$=input at time n, and $\pi j,i$ (n)=neighborhood function centered around winning node I(x).

Operations 205–250 are repeated until the extracted desired intelligent information is substantially same as the expected information.

Figure 3:
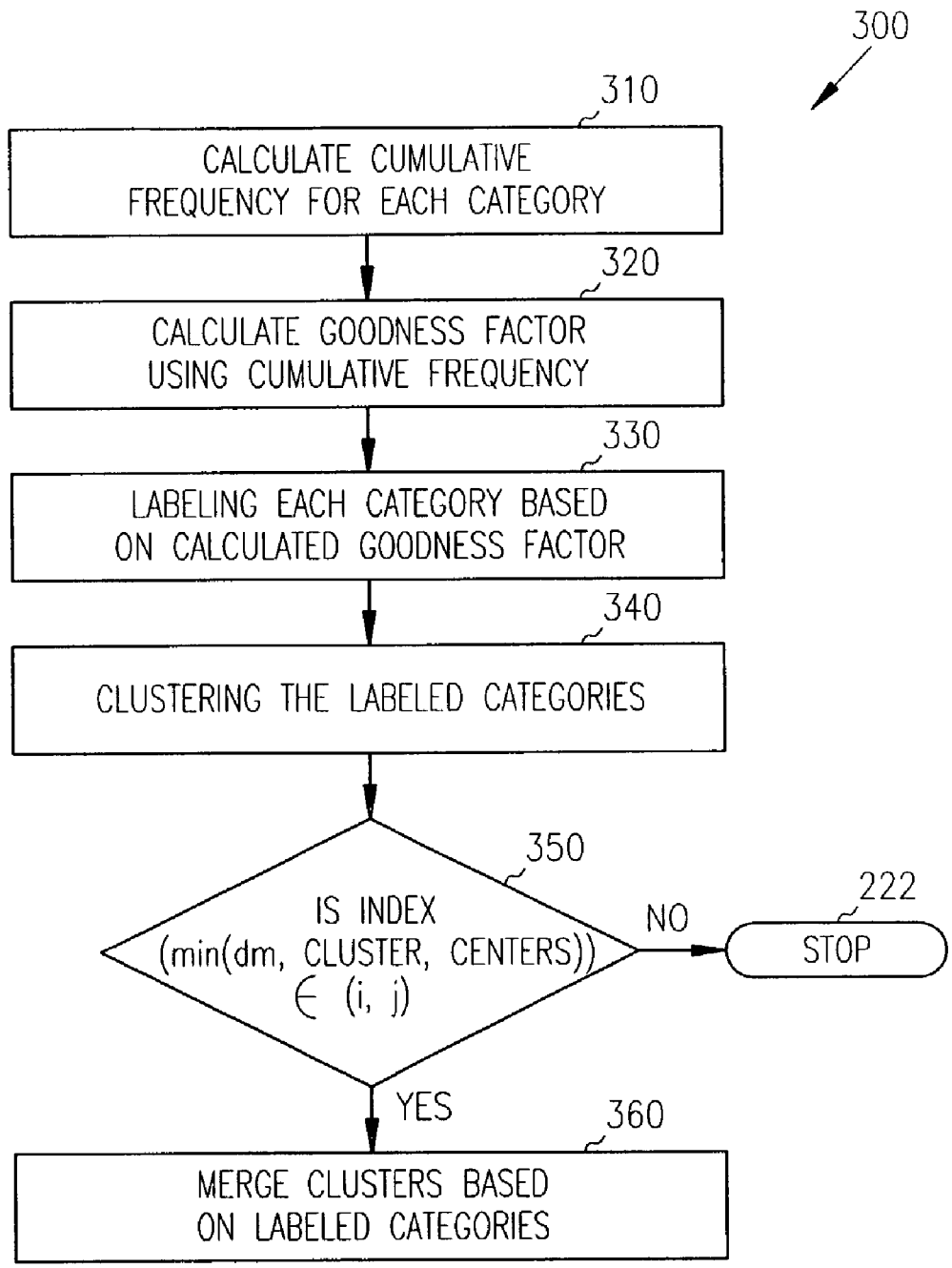
FIG. 3 is a flowchart illustrating one embodiment of using a clustering algorithm in intelligent information mining according to the present invention.

FIG. 3 is a flowchart illustrating one example embodiment of a process 300 of cluster formation according to the present invention. The flowchart includes operations 310–360, which are arranged serially in the exemplary embodiment. However, other embodiments of the invention may execute two or more operations in parallel using multiple processors or a single processor organized as two or more virtual machines or sub-processors. Moreover, still other embodiments implement the operations as two or more specific interconnected hardware modules with related control and data signals communicated between and through the modules, or as portions of an application specific integrated circuit. Thus, the exemplary process flow is applicable to software, firmware, and hardware implementations.

The process begins with operation 310 by calculating a cumulative frequency for each category mapped to a cell in the 3D template and dynamic information contextual relation maps. Operation 320 includes calculating a goodness factor for each calculated cumulative frequency. In some embodiments, goodness factor each category $C_i$, w.r.t each cell j is calculated using the equation:

$$G(C_i, j) = F^{Clust}(C_i)/F^{Coll}(C_i)$$

wherein $F^{Cell}$ is the category $C_i$ in relation to other categories in the cell j, $F^{Coll}$ relates to category $C_i$ to the whole collection, wherein $$G(C_i, j) = \frac{F_j(C_i) * F_j(C_i)}{F_J(C_i) + \sum_i \not\subset A_I^j F_j(C_i)}$$

wherein $i \subset A_i^j$ if d $(i,j)<(r_1$=the radius of the neutral zone), $r_1=3*d_{i,j,\ i,j}$ being adjacent and $F_j(C_i)=f_j(C_i)/\Sigma_j f_j(C_i)$– the relative frequency of category $C_i$, wherein $f_j(C_i)$=the frequency of category $C_i$ in j.

Operation 330 includes labeling each category mapped to a cell in the 3D template and 3D dynamic information based on the calculated goodness factor. Operation 340 includes clustering the labeled categories by applying least mean square error clustering algorithm to each of the categories.

Operation 350 then includes comparing each category using the following equation:

$$\text{index}(\min(d_{m,cluster\ centers})) \in (i,j)$$

Operation 350 includes stopping the process 300 if the above condition is not true otherwise operation 360 includes merging the clustered categories based on the labels. In some embodiments, clusters are merged by finding midpoint (m) between the centers of clusters (I,j). Distance from m to all cluster centers is then determined. The above equation is then used to merge the clusters.

Figure 4:
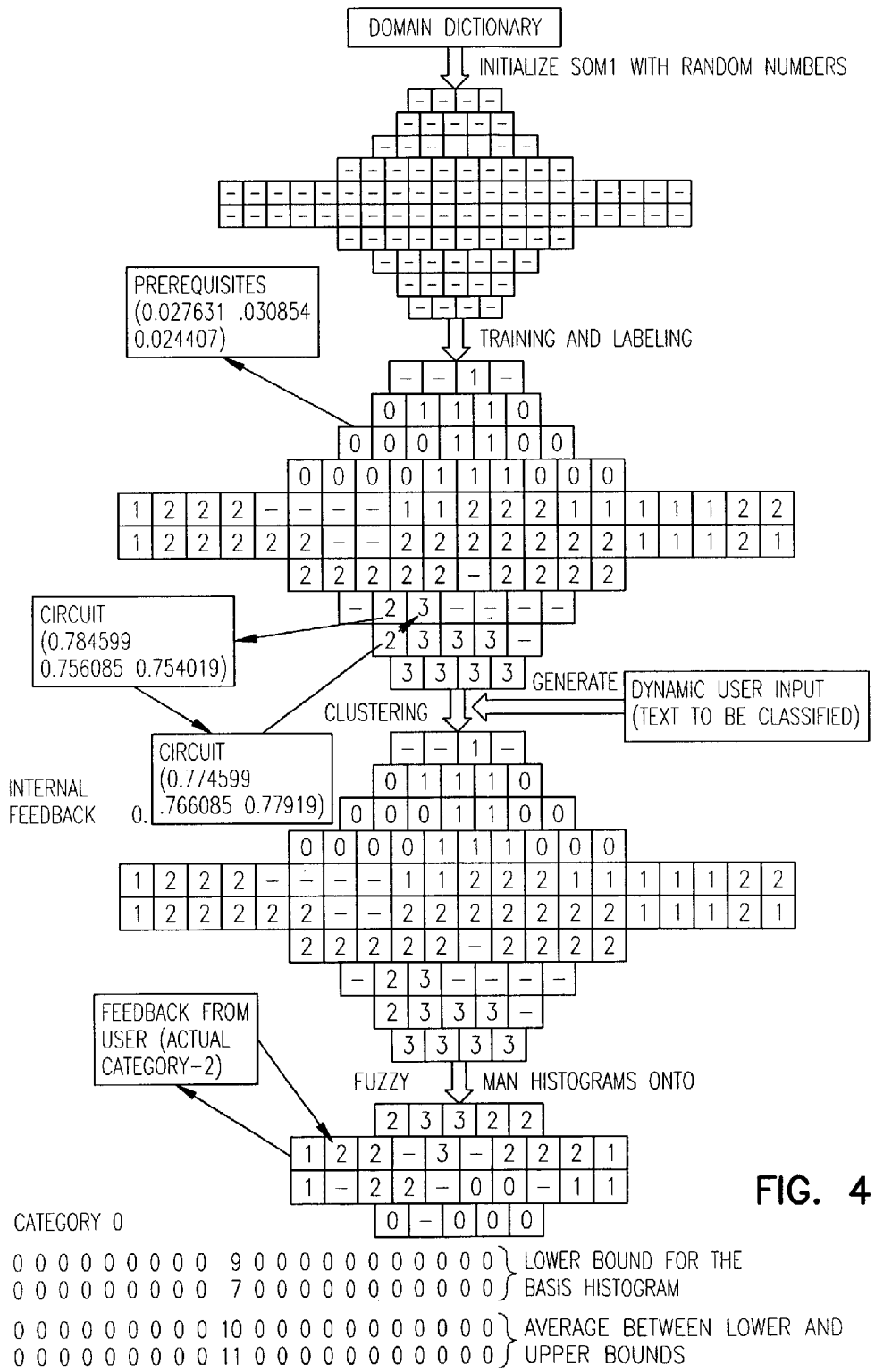
FIG. 4 is a schematic diagram illustrating the formation and of template and dynamic information three-dimensional contextual SOMs and mapping of the formed contextual SOMs to obtain desired intelligent information.

FIG. 4 and the following example including unstructured text including fault information received from aircraft maintenance manuals further illustrate the process of information mining technique employed by the present invention:

Category 1
PREREQUISITES MAKE SURE THESE SYSTEMS WILL OPERATE: AIR/GROUND SYSTEM (AMM 32-09-02 /201). MAKE SURE THE AIRPLANE IS IN THIS CONFIGURATION: ELECTRICAL POWER (AMM 24-22-00 /201)

Category 2
DO THE ANTENNA AND CABLE CHECK PROCEDURE FOR THE APPLICABLE LEFT CENTER,RIGHT) ILS RECEIVER (AMM 34-00-00/201 ). PERFORM PSEU BITE PROCEDURE (FIM 32-09-03, FIG. 103, BLOCK 7 ACTION).

Category 3
L OR R SYSTEM FAULTS, REPLACE THE PRESSURE SWITCH, S25 (S30), FOR THE ALTERNATING CURRENT MOTOR PUMP (ACMP) IN THE LEFT (RIGHT) HYDRAULIC SYSTEM (AMM 29-11-18 /401 ). C SYSTEM FAULTS, ADJUST THE PRESSURE SWITCH, S10003 (S10016), FOR THE ALTERNATING CURRENT MOTOR PUMP (ACMP) C1 (C2) IN THE CENTER HYDRAULIC SYSTEM (AMM 29-11-19 /401).

Category 4
EXAMINE AND RREPAIR THE CIRCUIT BETWEEN THE FCC CONNECTOR D381A, PIN K3 AND TB127, PIN G43 (WDM 22-15-12.). CHECK FOR CONTINUITY BETWEEN PINS A7 AND A8 OF CONNECTOR D2712A, (WDM 21-31-21. ).

After completing the operations 110 and 120 described-above with reference to FIG. 1, the following key-words, key-phrases, and unique numerical representations are obtained for each received category of unstructured text:

Word, Code & Winner Nodes for Category 1

PREREQUISITES (0.027631 0.030854 0.024407) *22* MAKE (0.030854 0.024407 0.036636) *22* SURE (0.024407 0.036636 0.037852) *22* THESE (0.036636 0.037852 0.036835) *22* SYSTEMS (0.037852 0.036835 0.043527) *22* WILL (0.036835 0.043527 0.028883) *22* OPERATE: (0.043527 0.028883 0.002341) *22* AIR/GROUND (0.028883 0.002341 0.036835) *22* SYSTEM (0.002341 0.036835 0.000068) *22* AMM (0.036835 0.000068 0.018451) *22* MAKE (0.030521 0.024407 0.036636) *22* SURE (0.024407 0.036636 0.002341) *22* AIRPLANE (0.036636 0.002341 0.000013) *22* IN (0.002341 0.000013 0.037857) *22* THIS (0.000013 0.037857 0.006376) *22* CONFIGURATION: (0.037857 0.006376 0.009961) *22* ELECTRICAL (0.006376 0.009961 0.030730) *22* POWER (0.009961 0.030730 0.000068) *22* AMM (0.030730 0.000068 0.015399) *22*

Word, Code & Winner Nodes for Category 2

DO (0.251298 0.250007 0.252589) *61* ANTENNA (0.250007 0.252589 0.255671) *61* CABLE (0.252589 0.255671 0.256019) *61* CHECK (0.255671 0.256019 0.280867) *61* PROCEDURE (0.256019 0.280867 0.250317) *71* FOR (0.280867 0.250317 0.252683) *61* APPLICABLE (0.250317 0.252683 0.272725) *61* LEFT (0.252683 0.272725 0.250155) *61* (CENTER,RIGHT) (0.272725 0.250155 0.250461) *61* ILS (0.250155 0.250461 0.283956) *61* RECEIVER (0.250461 0.283956 0.250068) *71* AMM (0.283956 0.250068 0.267012) *61* PERFORM (0.280567 0.280230 0.280904) *7* PSEU (0.280230 0.280904 0.280904) *7* PSEU (0.280904 0.280904 0.254216) *7* BITE (0.280904 0.254216 0.250001) *5* E (0.254216 0.250001 0.280867) *7* PROCEDURE (0.250001 0.280867 0.250309) *7* FIM (0.280867 0.250309 0.261688) *5* FIG. (0.250309 0.261688 0.254357) *7* BLOCK (0.261688 0.254357 0.252048) *7* ACTION (0.254357 0.252048 0.253202) *7*

Word, Code & Winner Nodes for Category 3

L (0.500011 0.500001 0.500021) *61* OR (0.500001 0.500021 0.500001) *26* R (0.500021 0.500001 0.536835) *26* SYSTEM (0.500001 0.536835 0.511313) *10* FAULTS, (0.536835 0.511313 0.533973) *10* REPLACE (0.511313 0.533973 0.530854) *10* PRESSURE (0.533973 0.530854 0.536723) *10* SWITCH, (0.530854 0.536723 0.500317) *10* FOR (0.536723 0.500317 0.502491) *26* ALTERNATING (0.500317 0.502491 0.506677) *26* CURRENT (0.502491 0.506677 0.525109) *26* MOTOR (0.506677 0.525109 0.531013) *10* PUMP (0.525109 0.531013 0.500054) *10* (ACMP) (0.531013 0.500054 0.500013) *26* IN (0.500054 0.500013 0.522725) *26* LEFT (0.500013 0.522725 0.500899) *26* (RIGHT) (0.522725 0.500899 0.516218) *26* HYDRAULIC (0.500899 0.516218 0.536835) *26* SYSTEM (0.516218 0.536835 0.500068) *10* AMM (0.536835 0.500068 0.518451) *26*

C (0.518418 0.500001 0.536835) *26* SYSTEM (0.500001 0.536835 0.511313) *84* FAULTS, (0.536835 0.511313 0.502084) *26* ADJUST (0.511313 0.502084 0.530854) *26* PRESSURE (0.502084 0.530854 0.536723) *26* SWITCH, (0.530854 0.536723 0.500317) *13* FOR (0.536723 0.500317 0.502491) *26* ALTER (0.500317 0.502491 0.526291) *26* NATING (0.502491 0.526291 0.506677) *11* CURRENT (0.526291 0.506677 0.525109) *26* MOTOR (0.506677 0.525109 0.531013) *26* PUMP (0.525109 0.531013 0.500054) *26* (ACMP) (0.531013 0.500054 0.500013) *26* IN (0.500054 0.500013 0.505884) *10* CENTER (0.500013 0.505884 0.516218) *10* HYDRAULIC (0.505884 0.516218 0.536835) *26* SYSTEM (0.516218 0.536835 0.500068) *11* AMM (0.536835 0.500068 0.518451) *26*

Word, Code & Winner Nodes for Category 4

EXAMINE (0.772573 0.760548 0.784599) *79* RREPAIR (0.760548 0.784599 0.756085) *79* *79* BETWEEN (0.756085 0.754019 0.750301) *79* FCC (0.754019 0.750301 0.756376) *79* CONNECTOR (0.750301 0.756376 0.750802) *79* PIN (0.756376 0.750802 0.750802) *79* PIN (0.750802 0.750802 0.751140) *79* WDM (0.750802 0.751140 0.750971) *79* CHECK (0.753168 0.756019 0.750317) *79* FOR (0.756019 0.750317 0.756376) *79* CONTINUITY (0.750317 0.756376 0.754019) *79* BETWEEN (0.756376 0.754019 0.780423) *79* PINS (0.754019 0.780423 0.750021) *79* OF (0.780423 0.750021 0.756376) *79* CONNECTOR (0.750021 0.756376 0.751140) *79* WDM (0.756376 0.751140 0.753758) *79*

FIG. 4 illustrates the formation of a 3D template and dynamic contextual relation map and template and dynamic 3D structured map using a predetermined number of key-phrases from above transformed key-phrases. It further more illustrates the mapping of the formed 3D dynamic information structured map on to the template 3D structured map to obtain the desired intelligent information.

FIG. 4 and following example further illustrates computing a goodness factor for each category in the template and dynamic information 3D contextual maps. Further, the following example illustrates labeling, clustering, and merging the categories based on the computed goodness factor.

FIG. 4 is only an illustration of the concept. The numbers in the map shown need not be considered. The following example illustrates the actual computation, where the numbers are important.

Also, for further illustration, the categories such as:

0 0 0 0 0 0 0 0 9 0 0 0 0 0 0 0 0 0 0 0
0 0 0 0 0 0 0 0 7 0 0 0 0 0 0 0 0 0 0 0 represent a document vector. This vector gets mapped to a single cell in the 3D SOM map. In this way, FIG. 4, and the following example do not relate to the same entities.

SOM 1 Labeling

Labels Generated for each SOM 1 Elements is shown in figure For left top element in figure label is calculated as follows <1 2 19 0 *2*> Words mapped from first Category: 1

Similarly from second ,third and fourth are 2 ,19 & 0 respectively.

The Local goodness for category three label is calculated as follows $$F^{local}=1/(1+2+19+0)\ F^{local}=2(1+2+19+0)\ F^{local}=19/(1+2+19+0)\ F^{local}=19/(1+2+19+0)=0.8632$$

Global goodness for third category is $$F^{Global}=0.8632/(0.8632+0.3250+0+0.57676+\ldots +0.7250)=0.181\ \text{Neighboring 3 elements excluded.}$$

Effective Goodness=0.181*0.8632=0.1563

For categories goodnesses found to be 0.0012, 0.0019,0.0 (first second & fourth respectively)

Therefore category label assigned for element is 3.

SOM 1 Clustering

21 Clusters obtained.

Eg. CLUSTER 1 Center→0.053578 0.470783 0.853184 Radius→0.785714

Element Coordinates −0.083032 0.325694 0.941822

Category Label *0*

Element Coordinates 0.190189 0.615872 0.764546

Category Label *0*

Following illustrates the formation of basis histograms obtained by training and using template 3D contextual relation and structured maps shown in FIG. 4.

For Category 1 sentences:

0 0 0 0 0 0 0 0 0 9 0 0 0 0 0 0 0 0 0 0
0 0 0 0 0 0 0 0 0 7 0 0 0 0 0 0 0 0 0 0

For Category 2 sentences 0 0 2 0 0 0 0 0 0 7 1 0 0 0 0 0 0 0 0 0
0 0 1 0 0 0 0 0 0 8 4 0 0 0 0 0 0 0 0 0

For Category 3 sentences 0 3 0 0 2 2 0 0 4 0 0 0 7 0 0 0 0 0 0 0
0 1 0 1 2 2 0 0 3 0 0 0 5 0 0 0 0 0 0 0

For Category 4 sentences 0 0 0 0 0 0 8 0 0 0 0 0 0 0 0 0 0 0 0 0
0 0 0 0 0 0 21 0 0 0 0 0 0 0 0 0 0 0 0 0

Following illustrates the Fuzzy prediction by inputting the above basis histograms extracted from each category in the process of training:

Category 1

0 0 0 0 0 0 0 0 0 9 0 0 0 0 0 0 0 0 0 0
0 0 0 0 0 0 0 0 0 7 0 0 0 0 0 0 0 0 0 0 } Lower bound for the basis histogram 0 0 0 0 0 0 0 0 0 10 0 0 0 0 0 0 0 0 0 0
0 0 0 0 0 0 0 0 0 11 0 0 0 0 0 0 0 0 0 0 } Average between lower and upper bounds 0 0 0 0 0 0 0 0 0 17 0 0 0 0 0 0 0 0 0 0 } Upper bound for the basis histogram Category 2

0 0 0 0 0 0 0 0 0 4 3 0 0 0 0 0 0 0 0 0
0 0 1 0 0 0 0 0 0 5 1 0 0 0 0 0 0 0 0 0 } Lower bound for the basis histogram 0 0 1 0 0 0 0 0 0 7 3 0 0 0 0 0 0 0 0 0
0 0 1 0 0 0 0 0 0 8 2 0 0 0 0 0 0 0 0 0 } Average between lower and upper bounds 0 0 0 0 0 0 0 0 0 12 1 0 0 0 0 0 0 0 0 0
0 0 4 0 0 0 0 0 0 12 4 0 0 0 0 0 0 0 0 0 } Upper bound for the basis histogram Category 3

0 1 0 0 1 0 0 0 2 0 0 0 1 0 0 0 0 0 0 0
0 2 0 0 1 0 0 0 1 0 0 0 1 0 0 0 0 0 0 0 } Lower bound for the basis histogram 0 2 0 0 3 4 0 0 3 0 0 0 5 0 0 0 0 0 0 0
0 2 0 0 3 1 0 0 3 0 0 0 5 0 0 0 0 0 0 0 } Average between lower and upper bounds 0 3 0 0 2 2 0 0 4 0 0 0 7 0 0 0 0 0 0 0
0 4 0 0 4 1 0 0 3 0 0 0 6 0 0 0 0 0 0 0 } Upper bound for the basis histogram Category 4

0 0 0 0 0 0 8 0 0 0 0 0 0 0 0 0 0 0 0 0 } Lower bound for the basis histogram 0 0 0 0 0 0 14 0 0 0 0 0 0 0 0 0 0 0 0 0
0 0 0 0 0 0 13 0 0 0 0 0 0 0 0 0 0 0 0 0 } Average between lower and upper bounds 0 0 0 0 0 0 17 0 0 0 0 0 0 0 0 0 0 0 0 0
0 0 0 0 0 0 21 0 0 0 0 0 0 0 0 0 0 0 0 0 } Upper bound for the basis histogram Input to Fuzzy prediction is 0 0 0 0 3 0 0 0 3 0 0 0 1 0 0 0 0 0 0 0 0 2. Correct classification is category 2. Classification obtaining by 3D dynamic information structured map is 1. Classification obtained using fuzzy prediction is category 2. Therefore, LVQ based negative learning is applied to the 3D template information structured map.

Figure 5:
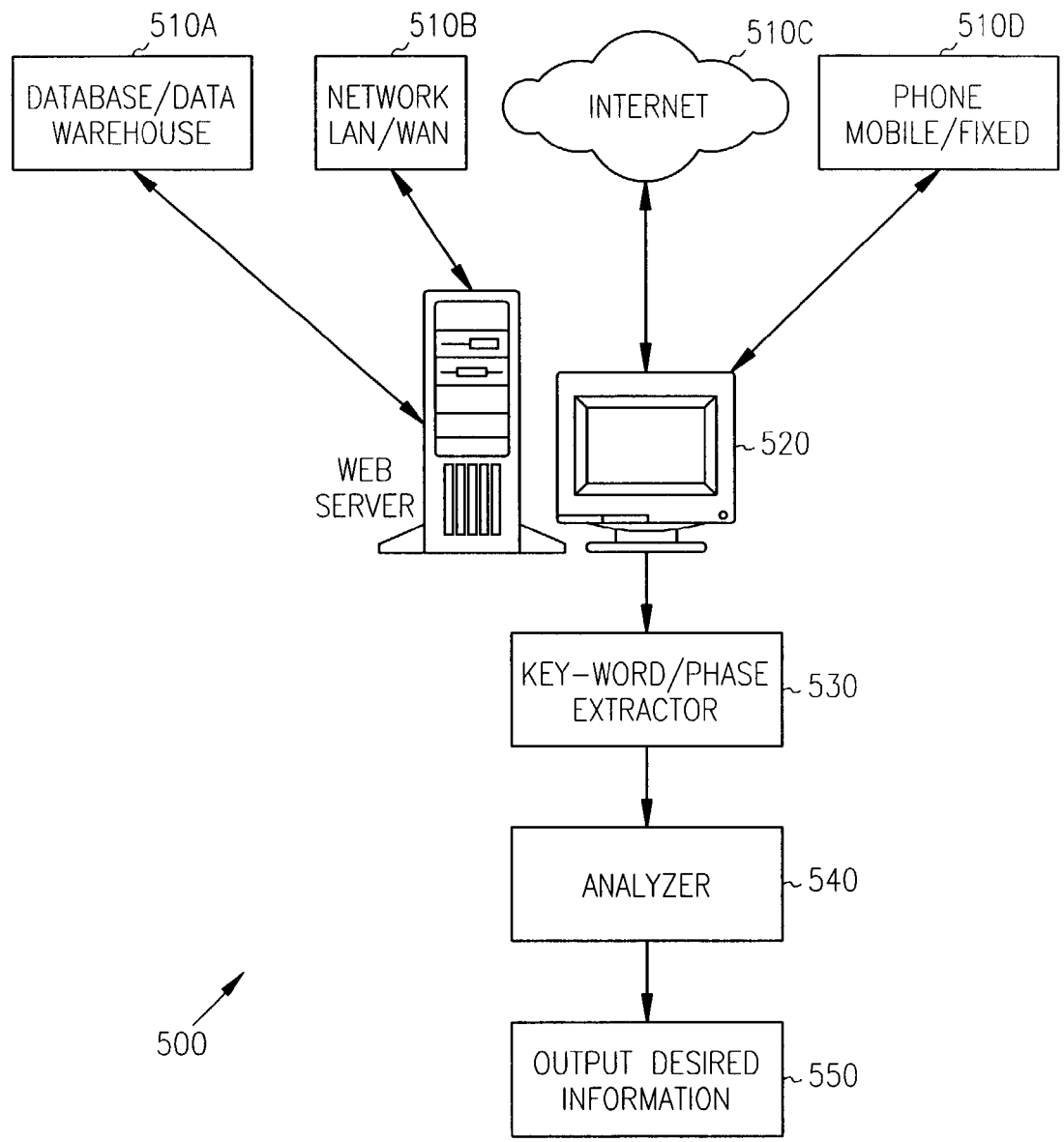
FIG. 5 is an overview illustrating one embodiment of a computer-implemented system according to the present invention.

FIG. 5 illustrates an overview of one embodiment of a computer-implemented system 500 according to the present invention. A web server 520 is connected to receive unstructured text from various sources 510A, 510B, 510C and 510D. For example, the web server 520 can receive unstructured text from sources, such as a data base/data warehouse, a LAN/WAN network, SAN (Storage Area Networks) Internet, a voice recognition system, and/or a telephone. In some embodiments, the unstructured text can be product-related text that can come from sources such as product manuals, maintenance manuals, and/or answers to frequently asked questions (FAQs). The received text can be in any natural language.

The computer-implemented system 500 includes a key-word/phrase extractor 530. The key-word/phrase extractor 530 is connected to the web server 520 and extracts multiple key-phrases from the received text. In some embodiments, the key-word/phrase extractor 530 can also extract multiple key-words from the received text and can form the multiple key-phrases from the extracted key-words. In some embodiments, the keyword/phrase extractor 530 extracts key-words from the received text based on specific criteria such as filtering to remove all words comprising three or fewer letters, filtering to remove general words, and/or filtering to remove rarely used words. The formed key-phrases can include one or more extracted key words and any associated preceding and succeeding (following) words adjacent to the extracted key words to include contextual information. In some embodiments, the key-word/phrase extractor 530 can further morphologize the extracted key-words based on fundamental characteristics of the extracted key-words. For example, the key-word/phrase extractor 530 can morphologize in such a way that morphed (altered) words' pronunciation or meaning remain in place.

An analyzer 540 is coupled to the key-word/phrase extractor 530 transforms each of the extracted product-related information and query key-words, phrases and/or morphed words to a unique numerical representation such that the transformed unique numerical representation does not result in multiple similar numerical representations, to avoid ambiguous prediction of meaning of the translated words in the received text. Analyzer 540 also performs the three dimensional mapping and classification as described above.

Block 550 represents an interface for communicating desired information generated by system 500. In some embodiments, block 550 provides the information to a display for display to a user. In further embodiments, block 550 provides the information via a network to another system on the network, or simply stores the information in local or remote storage for later use.

Figure 6:
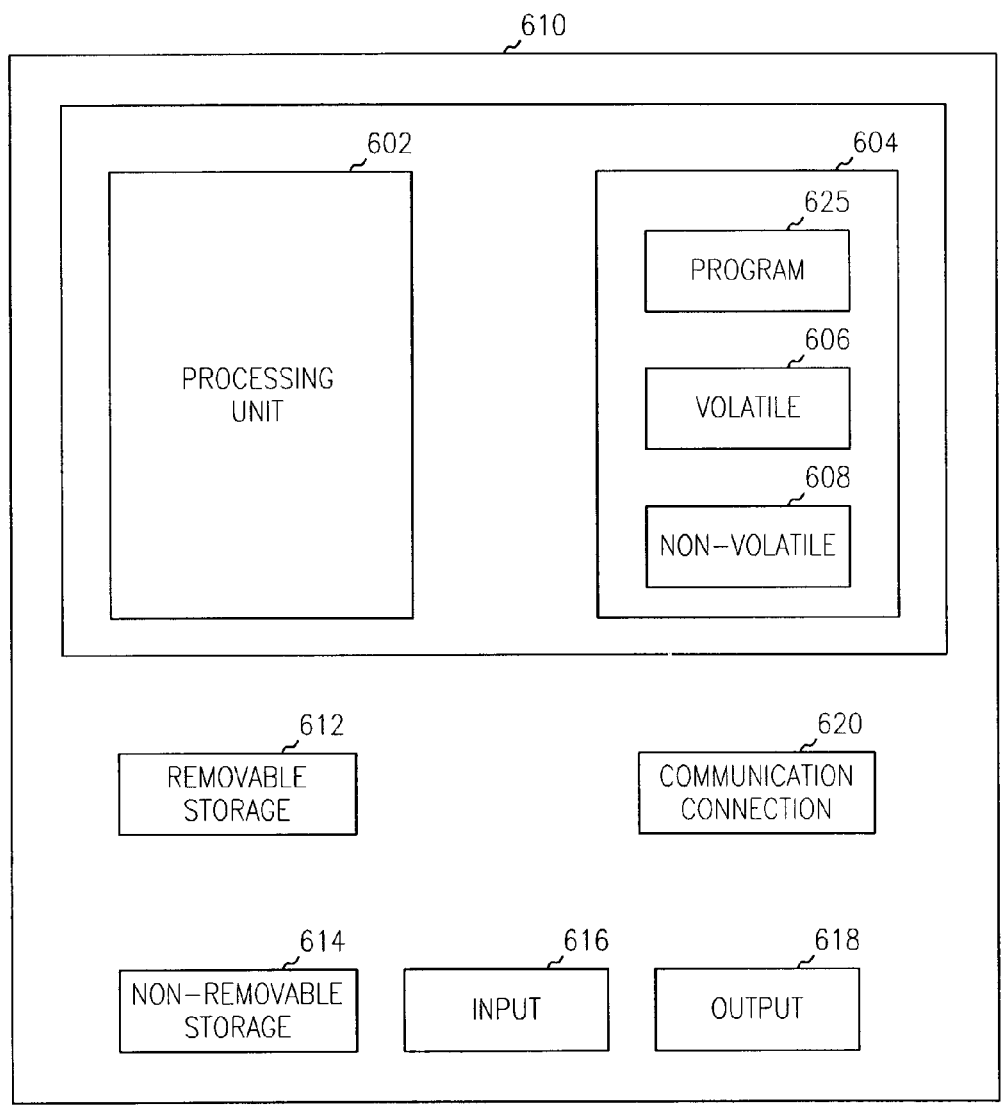
FIG. 6 shows an example of a suitable computing system environment for implementing embodiments of the present invention, such as those shown in FIGS. 1, 2, 3, 4, and 5.

FIG. 6 shows an example of a suitable computing system environment 600 for implementing embodiments of the present invention, such as those shown in FIGS. 1, 2, 3, 4, and 5. Various aspects of the present invention are implemented in software, which may be run in the environment shown in FIG. 6 or any other suitable computing environment. The present invention is operable in a number of other general purpose or special purpose computing environments. Some computing environments are personal computers, server computers, hand-held devices, laptop devices, multiprocessors, microprocessors, set-top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 6 shows a general computing device in the form of a computer 610, which may include a processing unit 602, memory 604, removable storage 612, and non-removable storage 614. Memory 604 may include volatile memory 606 and nonvolatile memory 608. Computer 610 may include—or have access to a computing environment that includes—a variety of computer-readable media, such as volatile memory 606 and non-volatile memory 608, removable storage 612 and non-removable storage 614. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium. For example, a computer program 625 capable of extracting desired intelligent information from unstructured text according to the teachings of the present invention may be included on a CD-ROM and loaded from the CD-ROM to a hard drive. The computer-readable instructions allow computer system 610 to provide generic access controls in a COM-based computer network system having multiple clients and servers.

CONCLUSION

The above-described computer-implemented technique provides, among other things, a method and apparatus for an intelligent information mining that can be domain independent, that can adapt in nature, that can exploit contextual information present in the text documents. In addition, the technique describes a closed loop system including an error feedback function to reduce clustering errors and cluster boundary sensitivity. The spherical SOM map described with respect to some embodiments is one illustration of the invention. Further embodiments utilized a generalized n dimensional SOM map.

What is claimed is:

1. An information mining method, comprising:
   extracting multiple key-phrases from unstructured text;
   obtaining a predetermined number of key-phrases from the multiple key-phrases;

generating a layer of template contextual relation map by mapping the predetermined number of key-phrases to a three-dimensional map using a self-organizing map;

generating a layer of dynamic information contextual relation map for the received unstructured text by mapping the transformed key-phrases to the three-dimensional map using the self-organizing map;

forming phrase clusters for the template contextual relation map;

mapping phrases of the information to be classified using the phrase clusters of the generated template contextual relation map;

constructing template and dynamic information key-phrase frequency histograms consisting of the frequency of occurrences of key-phrases, respectively, from the generated template contextual relation map and the dynamic information contextual relation map;

generating template and dynamic information three-dimensional structured maps from each of corresponding template and dynamic key-phrase frequency histograms; and extracting desired information by mapping the dynamic information three-dimensional structured map on to the template three-dimensional structured map.

2. The method of claim 1, further comprising:

receiving unstructured text from various text sources, wherein the text sources are selected from the group comprising of product manuals, maintenance manuals, and any documents including unstructured text.

3. The method of claim 1, further comprising:

extracting multiple key-phrases from the unstructured text sources; and forming the multiple key-phrases from each of the extracted multiple key-phrases.

4. The method of claim 3, wherein extracting multiple key phrases comprises:

extracting multiple key-phrases from the unstructured text sources based on specific criteria selected from the group comprising filtering to removing all words comprising three or fewer letters, filtering to remove general words, and filtering to remove rarely used words.

5. The method of claim 3, wherein the key-phrases comprise:

one or more key-words and/or one or more key-phrases.

6. The method of claim 3, wherein key-phrases comprise:

one or more extracted key-phrases and associated preceding and following words adjacent to the extracted key-phrases to include contextual information.

7. The method of claim 1, further comprising:

transforming each of the extracted key-phrases into a unique numerical representation.

8. An intelligent information mining method, comprising:

receiving unstructured text;

extracting multiple key-phrases from the unstructured text;

transforming each of the extracted key-phrases into a unique numerical representation;

obtaining a predetermined number of key-phrases from the transformed key-phrases;

generating a layer of template contextual relation map by mapping the predetermined number of key-phrases on to a surface of a three-dimensional map using a self-organizing map;

generating a layer of dynamic information contextual relation map for the received unstructured text by mapping the transformed key-phrases on to the surface of the three-dimensional map using the self-organizing map;

forming phrase clusters for the template contextual relation map;

forming phrase clusters for the dynamic information contextual relation map by using the phrase clusters of the generated template contextual relation map;

constructing template and dynamic information key-phrase frequency histograms consisting of the frequency of occurrences of key-phrases, respectively, from the generated template contextual relation map and the dynamic information contextual relation map; and generating template and dynamic information three-dimensional structured maps from each of corresponding template and dynamic key-phrase frequency histograms extracting desired information by mapping the dynamic information three-dimensional structured map on to the template three-dimensional structured map.

9. The method of claim 8, wherein the unstructured text is received from sources selected from the group consisting of a data base/data warehouse, a LAN/WAN network, SAN, Internet, a voice recognition system, and a mobile/fixed phone.

10. The method of claim 9, wherein the received unstructured text can be in any natural language.

11. A computer implemented method, comprising:

extracting multiple key-phrases from unstructured text;

obtaining a predetermined number of multiple key-phrases from the multiple key-phrases;

generating a layer of template contextual relation map by mapping the predetermined number of multiple key-phrases on to a surface of a spherical map using a self-organizing map;

generating a layer of dynamic information contextual relation map for the received unstructured text by mapping the multiple key-phrases on to the surface of the spherical map using the self-organizing map;

forming phrase clusters for the template contextual relation map;

forming phrase clusters for the dynamic information contextual relation map by using the phrase clusters of the generated template contextual relation map;

constructing template and dynamic information key-phrase frequency histograms consisting of the frequency of occurrences of key-phrases, respectively, from the generated template contextual relation map and the dynamic information contextual relation map;

generating template and dynamic information three-dimensional structured maps from each of corresponding template and dynamic key-phrase frequency; and extracting desired information by mapping the dynamic information three-dimensional structured map on to the template three-dimensional structured map.

12. The computer implemented method of claim 11, further comprising:

receiving unstructured text from various text sources, wherein the text sources are selected from the group comprising of product manuals, maintenance manuals, and any documents including unstructured text.

13. The computer implemented method of claim 11 further comprising:

extracting multiple key-phrases from the unstructured text sources; and forming the multiple key-phrases from each of the extracted multiple key-phrases.

14. The computer implemented method of claim 13, wherein key-phrases comprise:
one or more extracted key-phrases and associated preceding and following words adjacent to the extracted key-phrases to include contextual information.

15. The computer implemented method of claim 14 wherein extracting multiple key-phrases comprises:
extracting multiple key-phrases from the unstructured text sources based on specific criteria selected from the group comprising filtering to removing all words comprising three or fewer letters, filtering to remove general words, and filtering to remove rarely used words.

16. The computer implemented method of claim 15, further comprising:
transforming each of the extracted key-phrases into a unique numerical representation.

17. An intelligent information mining method, comprising:
receiving unstructured text from various unstructured text sources;
extracting multiple key-phrases from the unstructured text;
transforming each of the multiple key-phrases into a unique numerical representation;
obtaining a predetermined number of transformed key-phrases from the transformed multiple key-phrases;
generating a first layer template contextual relation map by mapping the predetermined number of key-phrases to surface of a three-dimensional map using a self-organizing map to categorize each of the predetermined number of transformed key-phrases based on contextual meaning;
forming phrase clusters using the first layer template contextual relation map;
constructing a template phrase frequency histogram consisting of frequency of occurrences of predetermined number of transformed key-phrases from the first layer template contextual relation map;
generating a three-dimensional template structured map using the template phrase frequency histogram so that the generated three-dimensional template structured document map includes text clusters based on similarity of relationship between the formed phrase clusters;
generating a dynamic information contextual relation map by mapping remaining transformed key-phrases to a three-dimensional dynamic information map using the self-organizing map to categorize the remaining key-phrases based on the contextual meaning;
constructing a dynamic information key phrase frequency histogram consisting of frequency of occurrences of remaining transformed key-phrases from the generated dynamic information contextual relation map;
generating a three-dimensional dynamic information structured document map using the dynamic information phrase frequency histogram and the generated dynamic information contextual relation map which includes clusters of information using the self-organizing map such that locations of the information in the clusters determine similarity relationship among the formed clusters; and
extracting desired information by mapping the generated three-dimensional dynamic information structured document map over the generated three-dimensional template structured document map.

18. The method of claim 17, further comprising:
extracting multiple key-phrases from the unstructured text sources; and
forming the multiple key-phrases from each of the extracted multiple key-phrases.

19. The method of claim 18, wherein extracting multiple key-phrases comprises:
extracting multiple key-phrases from the unstructured text sources based on a specific criteria selected from the group comprising, filtering to remove all words comprised of three or fewer letters, and filtering to remove rarely used words.

20. The method of claim 19, wherein the key-phrases can comprise:
one or more key-phrases and/or one or more key-phrases.

21. The method of claim 20, wherein the key-phrases comprise:
one or more extracted key-phrases and associated preceding and following words adjacent to the extracted key-phrases to include contextual information.

22. The computer implemented method of claim 11, further comprising:
comparing extracted desired information to an expected desired information to compute any error in the extracted desired information;
if the error exists based on the outcome of the comparison, and wherein the error is due to the error in the formation of the template three dimensional structured map using fuzzy prediction algorithm and basis histogram to extract desired information;
comparing the outcome of the extracted desired information obtained using fuzzy prediction algorithm and basis histogram to the expected desired information;
if the extracted desired information and the expected desired information are substantially same, then the dynamic information three-dimensional structured document map is corrected using learning vector quantization (LVQ) based negative learning error correcting algorithm;
if the extracted desired information and the expected desired information are not substantially same, then the template contextual relation map is corrected using the learning vector quantization (LVQ) based negative learning error correcting algorithm to correct the template contextual relation map;
extracting desired information using corrected template contextual relation map;
comparing the extracted desired information to the expected desired information; and
if the extracted desired information is substantially different form the expected desired information based on the outcome of the comparison, then repeating the above steps until the extracted desired information is substantially same as the expected desire information.

23. The computer implemented method of claim 22, wherein using the LVQ based negative learning error correcting algorithm to correct the template three-dimensional structured document map and the template contextual relation map comprises:
applying a substantially small negative and positive learning correction to an outer cover of the correct and incorrect clusters in the template three-dimensional structured document map and the template contextual relation map using the equation:

$$w_j(n+1)=w_j(n)-\eta(n)\ \pi_{j,i(x)}(n)[x(n)-w_j(n)]$$

$$w_j(n+1)=w_j(n)+\eta(n)\ \pi_{j,i(x)}(n)[x(n)-w_j(n)]$$

wherein $W_j$=weights of node j, X(n)=input at time n, and πj,i (n)=neighborhood function centered around winning node I(x).

24. An information mining method, comprising:
extracting multiple key-phrases from unstructured text;
transforming each of the multiple key-phrases into a unique numerical representation;
obtaining a predetermined number of transformed multiple key-phrases from the multiple key-phrases;
generating a layer of template contextual relation map by mapping the predetermined number of transformed multiple key-phrases on to a surface of a spherical map using a self-organizing map and a gaussian approximation neighborhood technique;
generating a layer of dynamic information contextual relation map for the received unstructured text by mapping the transformed multiple key-phrases on to the surface of the spherical map using the self-organizing map and the gaussian approximation neighborhood technique;
forming phrase clusters for the template contextual relation map;
forming phrase clusters for the dynamic information contextual relation map by using the phrase clusters of the generated template contextual relation map;
constructing template and dynamic information key-phrase frequency histograms consisting of the frequency of occurrences of key-phrases, respectively, from the generated template contextual relation map and the dynamic information contextual relation map;
generating template and dynamic information three-dimensional structured maps from each of corresponding template and dynamic key-phrase frequency histograms; and
extracting desired information by mapping the dynamic information three-dimensional structured map on to the template three-dimensional structured map, respectively.

25. The method of claim 24, further comprising:
extracting multiple key-phrases from the unstructured text sources; and
forming the multiple key-phrases from each of the extracted multiple key-phrases.

26. The method of claim 25, wherein extracting multiple key-phrases comprises:
extracting multiple key-phrases from the unstructured text sources based on a specific criteria selected from the group comprising, filtering to remove all words comprised of three or fewer letters, and filtering to remove rarely used words.

27. The method of claim 26, wherein the key-phrases can comprise:
one or more key-phrases and/or one or more key-phrases.

28. The method of claim 26, wherein the key-phrases comprise:
one or more extracted key-phrases and associated preceding and following words adjacent to the extracted key-phrases to include contextual information.

29. The method of claim 24, wherein the gaussian neighborhood function technique, comprises:
updating values of weight vectors of winner category and neighborhood using the equation:

$$w_j(n+1) = w_j(n) - \eta(n)\, \pi_{j,i(x)}(n)[x(n) - w_j(n)]$$

$$w_j(n+1) = w_j(n) + \eta(n)\, \pi_{j,i(x)}(n)[x(n) - w_j(n)]$$

wherein =weights of node j, X(n)=input at time n, and ηn,i (n)=neighborhood function centered around winning node I(x) given by the gaussian distribution function:

$$\exp(-d^2_{1,j}/2\sigma(n))$$

wherein η(n)=the learning rate with typical range [0.1–0.01], $\eta_0 \exp(-n/\tau_2)$, σ(n)=Standard deviation $\sigma_0 \exp(-n/\tau_1)$, $\sigma_0 = 3.14/6$, and $\tau_1$, $\tau_n$=time constants, where $\tau_1 = 1000/\log(\sigma_0)$ and $\tau_n 1000$.

30. The method of claim 24, further comprising:
calculating a cumulative frequency of each category mapped to a cell in the 3D template and 3D dynamic information contextual spherical maps;
calculating goodness factor for each calculated cumulative frequency;
labeling each category based on the calculated goodness factor; and
clustering the labeled categories using least mean square clustering algorithm.

31. The method of claim 30, further comprising:
if index $(\min(d_{m,cluster\ centers})) \in (i,j)$, then merging the clustered categories based on the labels, wherein m is midpoint between centers of clusters (I,J).

32. The method of claim 30, wherein calculating the goodness factor comprises:
calculating the goodness factor of all categories $C_i$, w.r.t each cell j using the equation:

$$G(C_{i,j}) = F\text{Clust}\,(C_i)/F^{Coll}(C_i)$$

wherein $F^{cell}$ is the category $C_i$ in relation to other categories in the cell j, $F^{Coll}$ relates to category $C_i$ to the whole collection, wherein $$G(C_i, j) = \frac{F_j(C_i) * F_j(C_i)}{F_j(C_i) + \sum_i \not\subset A_1^j F_j(C_i)}$$

wherein $i \subset A_1^j$ if $d(i,j) < (r_1$=the radius of the neutral zone), $r_1 = 3 * d_{i,j},\ _{i,j}$ being adjacent and $F_j(C_i) = f_j(C_i)/\Sigma_i f_j(C_i)$–the relative frequency of category $C_i$, wherein $f_j(C_i)$=the frequency of category $C_i$ in j.

33. A computer-implemented system for intelligent information mining, comprising:
a web server to receive unstructured text data from various text sources;
a key-word/phrase extractor to extract multiple key-phrases from the unstructured text data; and
an analyzer to transform each extracted key-phrase into a unique numerical representation such that the transformed unique numerical representation;
wherein the analyzer obtains a predetermined number of extracted multiple key-phrases and generates a layer of template contextual relation map by mapping predetermined number of multiple key-phrases to a three-dimensional map using a self organizing map and a gaussian distribution technique to categorize the predetermined number of multiple key-phrases based on contextual meaning;
wherein the analyzer generates a layer of dynamic information contextual relation map by mapping the multiple key-phrases to the three-dimensional map using a self-organizing map and a gaussian distribution technique to categorize the multiple key-phrases based on the contextual meaning;
wherein the analyzer forms word clusters for each of the generated contextual relation maps, and the analyzer further constructs a key-phrase frequency histogram consisting of frequency of occurrence of product and query related key-phrases, respectively from each of the generated contextual relation maps; and wherein the analyzer generates template and dynamic information three-dimensional structured document maps from the constructed key-phrase frequency histogram and the generated template and dynamic information contextual relation maps using the self-organizing map and wherein the analyzer further extracts desired information by mapping the dynamic information three-dimensional structured document map to template three-dimensional structured document map.

34. The system of claim 33, wherein the various text sources comprise:

text sources selected from the group comprising product manuals, maintenance manuals, and service manuals.

35. The method of claim 33, wherein the analyzer extracts multiple key-phrases from the received unstructured text sources, and wherein the analyzer forms multiple key-phrases from each of the extracted multiple key-phrases.

36. The system of claim 35, wherein the analyzer extracts multiple key-phrases from the unstructured text sources based on specific criteria selected from the group consisting of filtering to remove all words comprised of three or fewer letters, and filtering to remove rarely used words.

37. The system of claim 35, wherein the key-phrases comprise:

one or more key-phrases and/or one or more key-phrases.

38. The system of claim 35, wherein key-phrases comprise:

one or more extracted key-phrases and associated preceding and following words adjacent to the extracted key-phrases to include contextual information.

39. A computer-readable medium having computer executable instruction for intelligent information mining, comprising:

extracting multiple key-phrases from unstructured text;

obtaining a predetermined number of key-phrases from the multiple key-phrases;

generating a layer of template contextual relation map by mapping the predetermined number of key-phrases to a three-dimensional map using a self-organizing map;

generating a layer of dynamic information contextual relation map for the received unstructured text by mapping the transformed key-phrases to the three-dimensional map using the self-organizing map;

forming phrase clusters for the template contextual relation map;

forming phrase clusters for the dynamic information contextual relation map by using the phrase clusters of the generated template contextual relation map;

constructing template and dynamic information key-phrase frequency histograms consisting of the frequency of occurrences of key-phrases, respectively, from the generated template contextual relation map and the dynamic information contextual relation map;

generating template and dynamic information three-dimensional structured maps from each of corresponding template and dynamic key-phrase frequency histograms and the contextual relation maps; and extracting desired information by mapping the dynamic information three-dimensional structured map on to the template three-dimensional structured map.

40. A computer system for intelligent information mining, comprising:

a processor;

an output device; and a storage device to store instructions that are executable by the processor to perform a method of intelligent information mining from unstructured text data, comprising:

extracting key-phrases from unstructured text data;

generating three dimensional template contextual self organized maps based on the extracted key-phrases;

generating three dimensional dynamic information contextual self organized maps for information to be classified; and identifying desired information from a comparison of the three dimensional template maps with the dynamic information maps.

* * * * *